(12) United States Patent
Nagai et al.

(10) Patent No.: US 6,291,965 B1
(45) Date of Patent: Sep. 18, 2001

(54) BATTERY CHARGER

(75) Inventors: Tamiji Nagai; Toshitaka Takei, both of Kanagawa; Kuniharu Suzuki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/481,020

(22) Filed: Jan. 11, 2000

(30) Foreign Application Priority Data

Jan. 11, 1999 (JP) ................................................. 11-003966

(51) Int. Cl.⁷ ........................................................ H02J 7/00
(52) U.S. Cl. ............................................. 320/106; 320/110
(58) Field of Search ..................................... 320/106, 110, 320/125, 138, 132, 137

(56) References Cited

U.S. PATENT DOCUMENTS

| | | | |
|---|---|---|---|
| 5,872,444 | * | 2/1999 | Nagano et al. ........................ 320/106 |
| 5,912,544 | * | 6/1999 | Miyakawa et al. .................... 320/106 |
| 6,025,694 | * | 2/2000 | Mercke et al. ........................ 320/106 |

* cited by examiner

Primary Examiner—Peter S. Wong
Assistant Examiner—Lawrence Luk
(74) Attorney, Agent, or Firm—Jay E. Maioli

(57) ABSTRACT

A battery cartridge has a communication terminal from which control signals are sent to a charging adapter to deliver various pieces of information necessary for electrically charging the battery cartridge, such as charging stop information, capacity information, full charge information, battery defect information, and so on. Different kinds of charging modes can be distinguished by detecting a property curve of a charge voltage or a charge current input to the battery cartridge. In this manner, without reducing the whole number of pieces of information, the number of control signals from the communication terminal can be reduced. A judge circuit refers to a received control signal and one of the charging modes identified in a voltage detector circuit from the property curve of the charge voltage or current for identifying a particular kind of information corresponding to the control signal from the communication terminal and for controlling the charging operation in accordance with the identified information.

10 Claims, 16 Drawing Sheets

| INFORMATION | CONTROL SIGNAL | PERIOD |
|---|---|---|
| STOP_INFO | C3 | ALL PERIODS |
| CAP_INFO | C2 | CONSTANT CURRENT MODE |
| FULL_INFO | C2 | CONSTANT VOLTAGE MODE |
| DEFECT_INFO | C1 | PRE-CHARGING MODE |

| CONTROL SIGNAL | PULSES |
|---|---|
| C3 | 3 |
| C2 | 2 |
| C1 | 1 |

| INFORMATION | CONTROL SIGNAL | PERIOD |
|---|---|---|
| STOP_INFO | C12 | ALL PERIODS |
| CAP_INFO | C11 | CONSTANT CURRENT MODE |
| FULL_INFO | C11 | CONSTANT VOLTAGE MODE |
| DEFECT_INFO | C11 | PRE-CHARGING MODE |

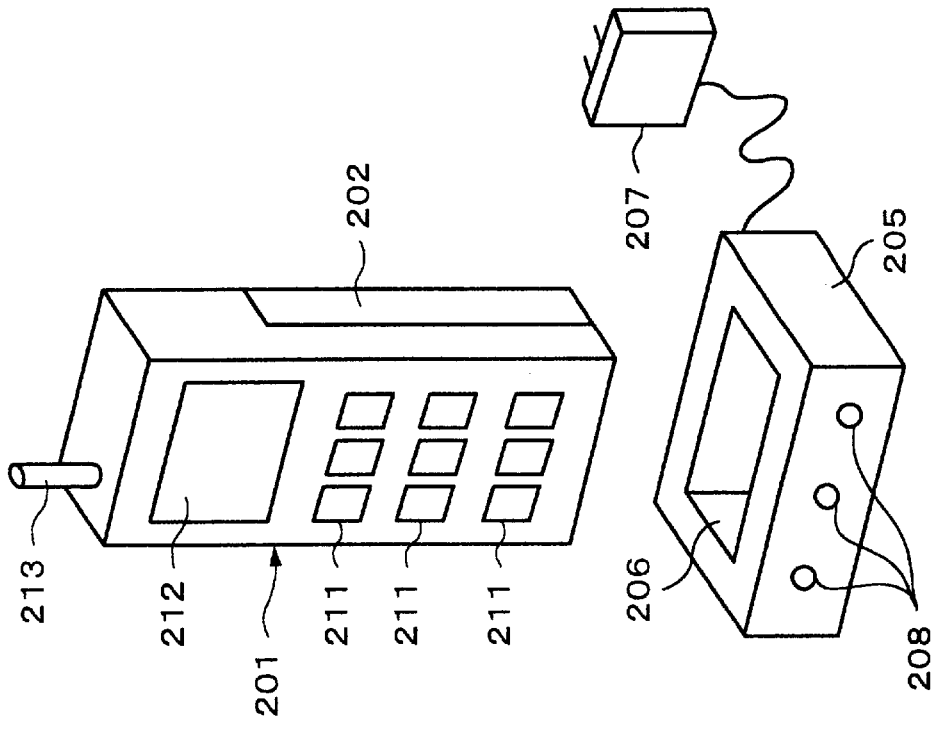
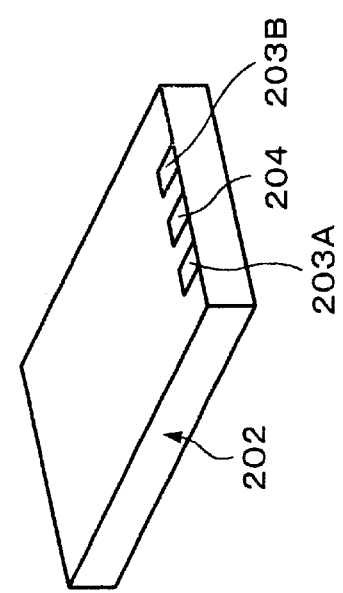

BATTERY CHARGER

BACKGROUND OF THE INVENTION

1. Field of the Invention

This invention relates to a battery charger suitable for use to charge a battery cartridge to be mounted in a portable telephone terminal, for example.

2. Description of the Related Art

FIGS. 21A and 21B show a general aspect of a conventional portable telephone terminal, battery cartridge to be mounted in the portable telephone terminal, and charging adapter for charging the battery cartridge.

In FIGS. 21A and 21B, the portable telephone terminal 201 has, on its front face, keys 211 for entry of telephone numbers, etc. and a display 212 for displaying a telephone number, dialing memorandum and other information. The portable telephone terminal 201 has an extensile antenna on its top. A battery cartridge 202 can be connected to the back face of the telephone terminal 201.

The battery cartridge 202 contains a secondary battery such as lithium ion battery, for example. As shown in FIG. 21B, the battery cartridge 202 has positive and negative terminals 203A, 203B, and a communication terminal 204. Output from he communication terminal 204 are charge stop information, capacity information, full charge information, battery defect information, and so on.

A charging adapter 205 has formed a hold portion 206 for holding the portable telephone terminal 201 with the battery cartridge 202 set in place. The charge adapter 205 is supplied with power from a power source adapter 207. The charge adapter 205 includes a charging circuit for controlling the charging operation of the battery cartridge 202.

When the battery cartridge 202 is charged, the portable telephone terminal 201 having the battery pack 202 in place is put in the hold portion 206 of the charging adapter 205, and the secondary battery inside the battery cartridge 202 is charged by the charging adapter 205.

The battery cartridge 202 has a display portion 208. Information on the charging status of the battery is shown on the display 208. If the battery is defective, or the charging is stopped by operation of the protection circuit, a warning about the situation is shown on the display 208. Display of such information like the charging control status and caution is based on information from the communication terminal 204 of the battery 202.

More specifically, output from the communication terminal 204 are charge stop information, capacity information, full charge information, battery defect information, and so forth. Charge stop information is output when the protection circuit is activated to stop the charging because of excessive heat generation of the battery, for example. Capacity information is given when the capacity of the battery becomes 70%, for example. Full charge information is generated when the battery is fully charged. Battery defect information is given when the betty is defective. In response to the capacity information or full charge information from the communication terminal 204, the charging state is controlled. Additionally, with the charge stop information or battery defect information from the communication terminal 204, a warning is displayed.

In order to reduce the size and weight of the entirety of the portable telephone terminal, it is important to reduce the size and weight of the battery cartridge 202. However, along with an increase of information output from the communication terminal 204 of the battery cartridge, structure of the battery cartridge 202 inevitably becomes complicated due to complex control signals output from the communication terminal 204, and this makes it difficult to reduce the size and weight or the battery cartridge 202.

That is, in the example shown above, four kinds of information, namely, charge stop information, capacity information, full charge information and battery defect information, are output from the communication terminal 204. Therefore, various control signals enough to make four or more kinds of representations are required to distinguish these four different kinds of information. When control signals are expressed in different numbers of pulses, it is necessary to enable counting and discrimination of four or more different numbers of pulses. If the control signals are expressed in different voltage levels, it is necessary to enable discrimination of four or more different voltage levels. As a result, encoding and decoding processes become complicated, and the circuit size increases. Further, together with complexity of control signals, the possibility of erroneous discrimination of control signals becomes high due to influences from noise, or the like. Therefore, the possibility of operation errors also increases.

It might be possible to provide a microcomputer in the battery cartridge 202 for processing signals from the communication terminal 204. The use of a microcomputer in the battery cartridge 202, however, makes it difficult to reduce the size and weight of the battery cartridge 202. Therefore, it is desirable to make up the entire circuit only with gate circuits without using a microcomputer.

Especially, as the portable telephone terminal, it is strongly desired to contain the charging adapter in the portable telephone terminal 201 and to charge the battery by directly connecting the power source adapter 207 to the portable telephone terminal 201 as shown in FIG. 22. When the charging adapter is built in the portable telephone terminal 201 in this manner, the demand for reducing the size and weight of the charging circuit becomes strong, and it is desired to simplify control signals from the communication terminal.

SUMMARY OF THE INVENTION

It is therefore an object of the invention to provide a battery charger enabling simplification of control signals from the communication terminal and thereby contributing to reduction of the size and weight of the battery.

According to the invention, there is provided a battery charger for electrically charging a battery cartridge having electrode terminals for charging a secondary battery and a communication terminal for controlling the charging operation of the secondary battery, comprising:

receiver means for receiving a control signal from the communication terminal;

charging mode judge means for identifying one of different charging modes from a charging curve of the secondary battery; and control means for identifying one of different pieces of information corresponding to the control signal from the communication terminal by reference to the control signal received by the receiver means and one of charging modes identified by the charging mode judge means, and controlling the charging operation in accordance with the identified information.

According to the invention, a control signal is associated with a piece of information in each charging mode. By thus assigning a control signal to a particular piece of information in each charging mode, a single control signal can be assigned to different kinds of information in different modes. These charging modes are discriminated by detecting properties of charge voltages and charge currents input to the battery cartridge. As a result, kinds of control signals from the communication terminal can be reduced without reducing the whole number of different kinds of information, and reduction in size and weight of the device is attained.

The above, and other, objects, features and advantage of the present invention will become readily apparent from the following detailed description thereof which is to be read in connection with the accompanying drawings.

BRIEF DESCRIPTION OF THE DRAWINGS

FIGS. 21A to 21B are perspective views used for explaining a conventional portable telephone terminal, battery cartridge mounted in the portable telephone terminal and charging adapter for charging the battery cartridge.

DETAILED DESCRIPTION OF THE PREFERRED EMBODIMENTS

Figure 1:
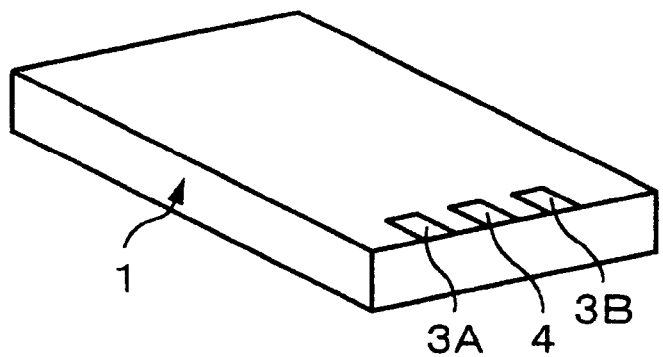
FIG. 1 is a perspective view showing an outer aspect of a battery cartridge to which the invention is applicable.

FIG. 1 shows an outer aspect of a battery cartridge 1 of a portable telephone terminal to which the invention is applicable. In FIG. 1, the battery cartridge 1 contains a secondary battery such as lithium ion battery, for example. The battery cartridge 1 has positive and negative terminals 3A, 3B, and a communication terminal 4.

Output from the communication terminal 4 are various information, such as charging stop information STOP_INFO, capacity information CAP_INFO, full charge information FULL_INFO, and battery defect information DEFECT_INFO, for example. These signals from the communication terminal 4 are used for controlling the charging and for displaying a caution.

Charge stop information STOP_INFO is output when the protection circuit is activated to stop the charging because of excessive heat generation of the battery, for example. Capacity information CAP_INFO is given when the capacity of the battery becomes 70%, for example. Full charge information FULL_INFO is generated when the battery is fully charged. Battery defect information DEFECT_INFO is given when the betty is defective.

In this manner, when various pieces of information are output from the communication terminal 4, each piece of information and each control signal are associated, in general. When four different kinds of information, namely, charging stop information STOP_INFO, capacity information CAP_INFO, full charge information FULL_INFO, and battery defect information DEFECT_INFO, for example, are output, four different kinds of control signals are typically used for these pieces of information. However, when each control signal is exclusive used for each piece of information, the number of control signals will increase and the processing will be complicated as the number of different kinds of information increases.

To cope with this problem, the embodiment shown here is configured to combine a control signal with a particular piece of information within each of different charging modes. By thus assigning a control signal to a particular piece of information in each charging mode, a single control signal can be assigned to necessary information selected in each charging mode. As a result, the number of control signals from the communication terminal 4 can be reduced without reducing the whole pieces of information.

In this manner, by assigning a control signal to a particular piece of information in each charging mode, a single control signal can be assigned to different kinds of information in different charging modes. However, when identifying the nature of information from a received control signal, the charging mode must be distinctively judged. Judgement of the charging mode is possible by detecting a charge voltage and/or a charge current of the battery cartridge as explained later.

Figure 2:
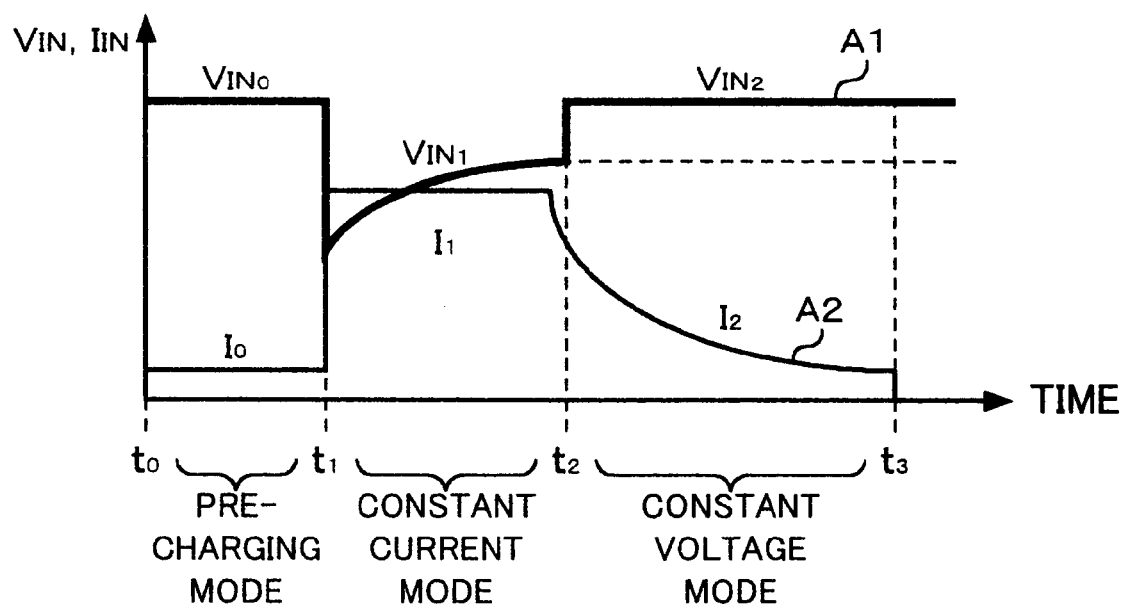
FIG. 2 is a graph showing the property of a voltage and a current input to the battery cartridge.

FIG. 2 shows the charging property of a lithium ion battery. In FIG. 2, time is put on the abscissa whereas charging voltage $V_{IN}$ and charge current $I_{IN}$ input to the lithium ion battery are put on the ordinate, and A1 shows changes in charge voltage whereas A2 shows changes in charge current.

As shown in FIG. 2, when the lithium ion battery is electrically charged, the circuit is set in a pre-charging mode in the first period of time t0 through t1. In the pre-charging mode, the battery is charged under a constant voltage $V_{IN0}$ and a small charge current $I_0$.

In the period of time from t1 to t2 next to the pre-charging mode, the circuit is set in a constant current mode. In the constant current mode, the battery is charged under a constant current $I_1$. Thus, the voltage $V_{IN1}$ in this period gradually rises in the progress of the electric charging.

When the constant current mode comes to the end, the circuit is set in a constant voltage mode in the period of time from t2 to t3. In the constant voltage mode, the lithium ion voltage is charged under the constant voltage $V_{IN2}$. The current $I_2$ in this period gradually falls with the progress of the electric charging of the battery.

In this manner, in case of the lithium ion battery, the pre-charging mode, constant current mode and constant voltage mode are set. Then, the charge voltage and the charge current of the lithium ion battery change in different aspects among different charging modes as shown in FIG. 2. Therefore, different charging modes can be distinguished with reference to the level and changing ratio of the charge voltage $V_{IN}$ and the level and changing ratio of the charge voltage $I_{IN}$.

That is, the charge voltage $V_{IN}$ exhibits relatively high voltage levels, $V_{IN0}$ and $V_{IN2}$, in the pre-charging and constant voltage modes, as shown by the property A1. In the constant current mode, however, the charge voltage $V_{IN}$ drops to the lower voltage level $V_{IN1}$, and gradually changes with the progress of the electric charging.

Figure 3:
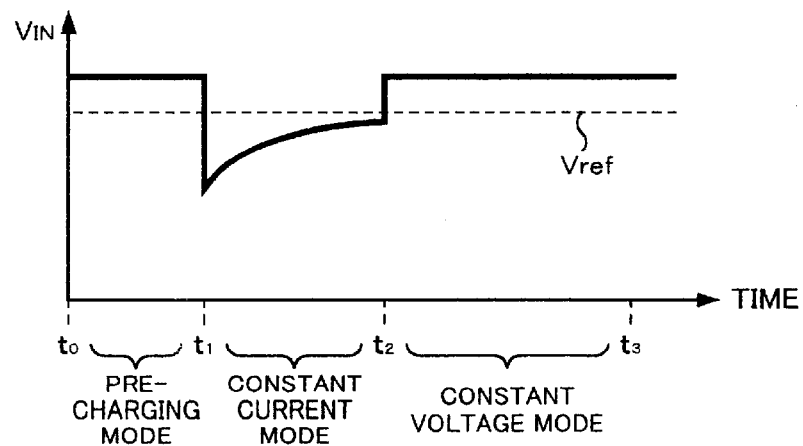
FIG. 3 is a graph showing the property of a voltage input to the battery cartridge.

Therefore, as shown in FIG. 3, by detecting the level of the charge voltage $V_{IN}$ and compares this level with the level of a reference voltage Vref, the charging mode can be judged to be the pre-charging or constant voltage mode if the charge voltage $V_{IN}$ is higher than the reference voltage Vref and to be the constant current mode if the charge voltage $V_{IN}$ is lower than the reference voltage Vref.

Figure 4:
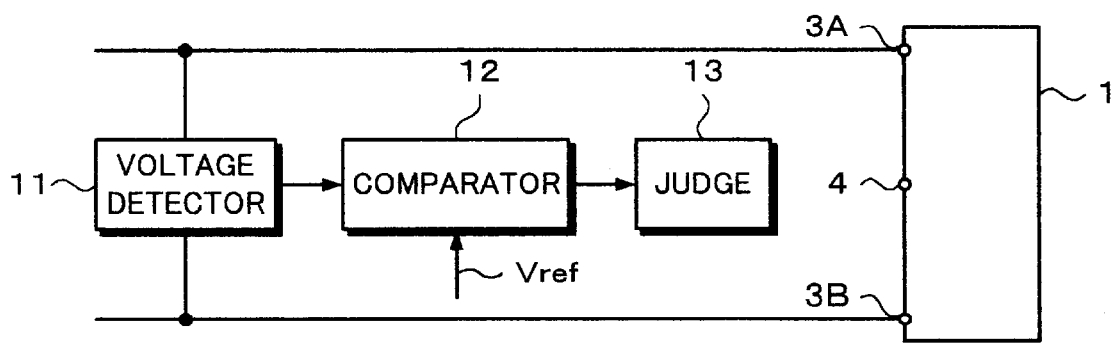
FIG. 4 is a block diagram of a charging mode judge circuit.

FIG. 4 shows an example in which the charging mode is identified by comparing the level of the charge voltage $V_{IN}$ with the reference voltage Vref. In FIG. 4, the level of the charging voltage applied across the positive terminal 3A and the negative terminal 3B of the battery cartridge 1 is detected by a voltage detector circuit 11. Output from the voltage detecting circuit 11 is supplied to a comparator circuit 12. The comparator circuit 12 is also supplied with the reference voltage Vref, and compared the level of the charge voltage $V_{IN}$ with the level of the reference voltage Vref. Output from the comparator circuit 12 is supplied to a judge circuit 13. The judge circuit 13 judges the charging mode from the output of the comparator circuit 12. That is, if the level of the charge voltage $V_{IN}$ is higher than the level of the reference voltage Vref, the mode is identified as the pre-charging or constant voltage mode. If the level of the charge voltage $V_{IN}$ is lower than the reference voltage level Vref, the mode is identified as the constant current mode.

In addition, as shown in FIG. 3, although the charge voltage $V_{IN}$ is constant in the pre-charging mode or in the constant voltage mode, it changes in the constant current mode with the progress of the electric charging. Therefore, by detecting the changing ratio of the charge voltage $V_{IN}$, the mode can be identified as the pre-charging or constant voltage mode if the changing ratio of the charge voltage $V_{IN}$ is smaller than a predetermined value, or as the constant current mode if the changing ratio of the charge voltage $V_{IN}$ is larger than the predetermined value.

Figure 5:
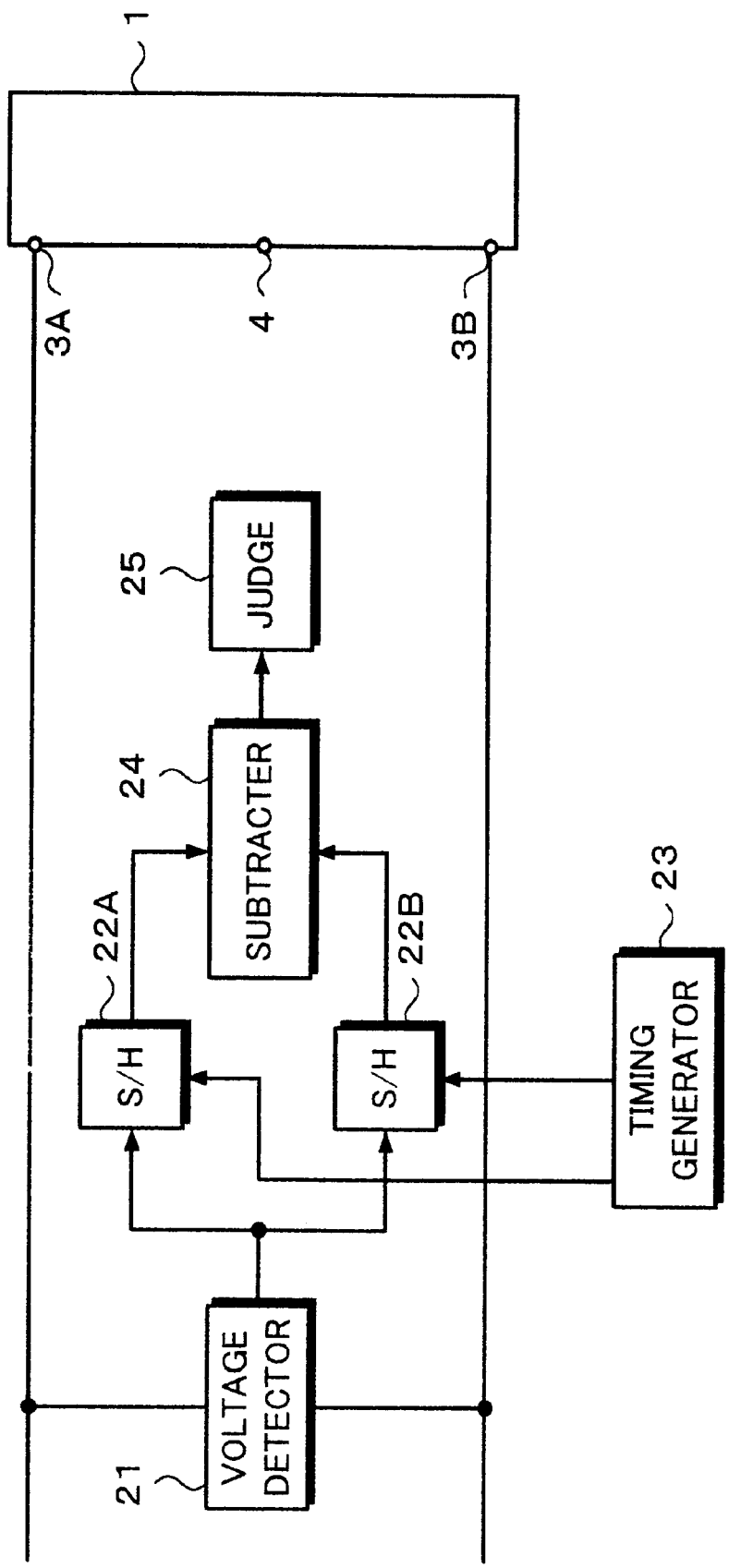
FIG. 5 is a block diagram showing another charging mode judge circuit.

FIG. 5 shows a structure of the judge circuit configured to judge the charging mode by detecting the changing ratio of the charge voltage $V_{IN}$. In FIG. 5, the level of the charge voltage $V_{IN}$ input across the positive terminal 3A and the negative terminal 3B of the battery cartridge 1 is detected by the voltage detector circuit 21. Output of the voltage detector circuit 21 is supplied to sample hold circuits 22A and 232B. These sample hold circuits 22A and 22B are also supplied with hold pulses from a timing generating circuit 23 at predetermined time intervals ΔT, and they hold values of the charge voltage $V_{IN}$ taken at different points of time of the predetermined interval ΔT. Outputs of the sample hold circuits 22A and 22B are applied to a subtracter circuit 24 to undergo subtraction there. As a result, the changing ratio of the charge voltage $V_{IN}$ in the interval ΔT is calculated. Output of the subtracter circuit 24 is supplied to a judge circuit 25, and the judge circuit 25 judges the charging mode from the output of the subtracter circuit 24. That is, the mode is identified to be the pre-charging or constant voltage mode if the changing ratio of the charge voltage $V_{IN}$ is smaller than a predetermined value or to be the constant current mode if the changing ratio of the charge voltage $V_{IN}$ is larger than the predetermined value.

Figure 6:
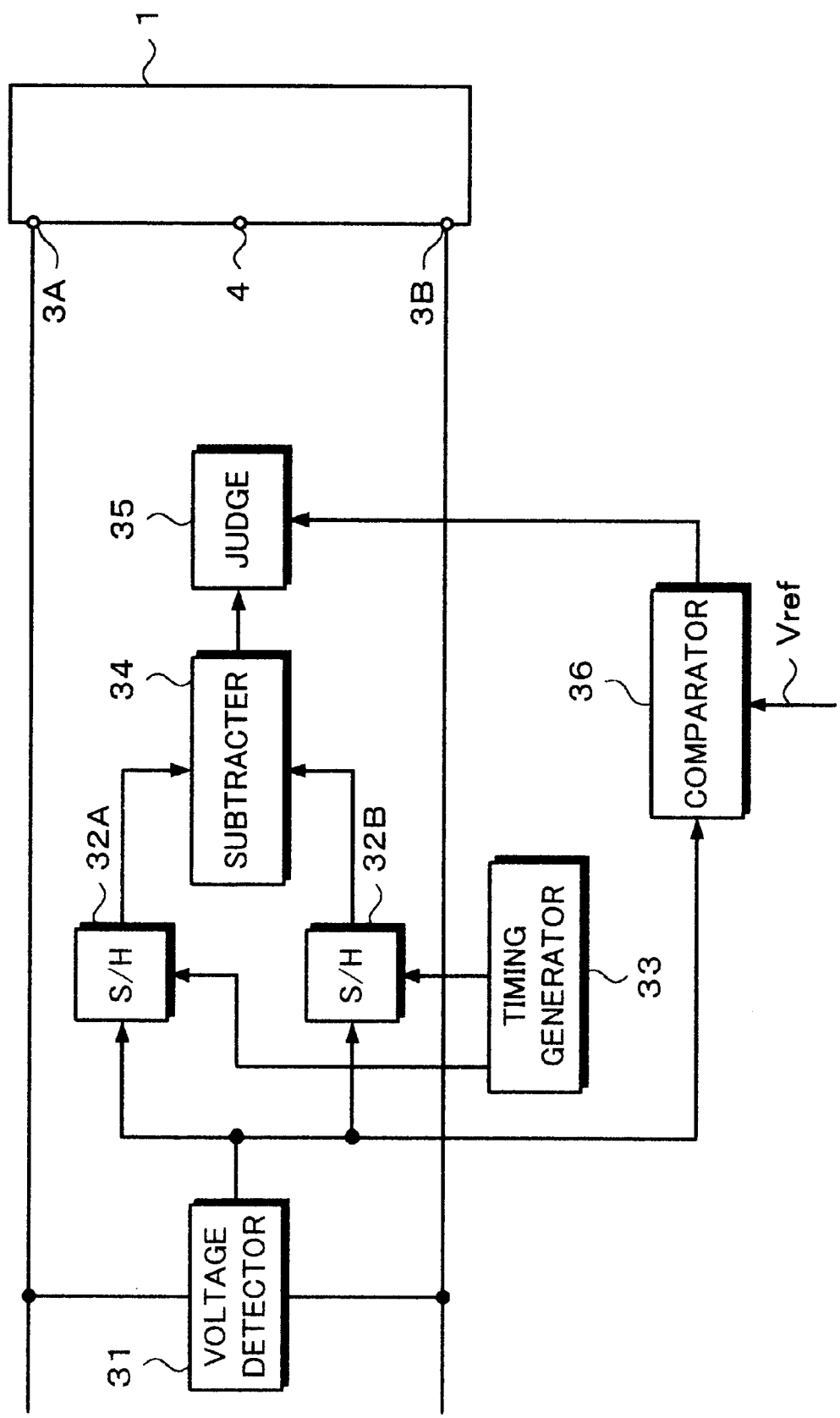
FIG. 6 is a block diagram showing another charging mode judge circuit.

Further, as shown in FIG. 6, it is also possible to design the circuit so that a voltage detector circuit 31 detects the level of the charge voltage $V_{IN}$ input across the positive terminal 3A and the negative terminal 3B of the battery cartridge 1, sample hold circuits 32A, 32B, timing generating circuit 33 and subtracter circuit 34 detect the changing ratio of the charge voltage $V_{IN}$, the comparator circuit 36 detects whether the level of the charge voltage $V_{IN}$ is higher or not than the reference voltage Vref, and a judge circuit 35 judges the charging mode from the changing ratio of the charge voltage $V_{IN}$ and from the level of the charge voltage $V_{IN}$ in comparison with the reference voltage Vref.

Since the voltage $V_{IN0}$ in the pre-charging mode and the voltage $V_{IN2}$ in the constant voltage mode are approximately equal, and the pre-charging mode and the constant voltage mode cannot be distinguished from each other by using the values of the charge voltage.

The charging mode can be judged from the charge current $I_{IN}$ as well. That is, as shown in FIG. 2, the charge current $I_{IN}$ is a small current $I_0$ in the pre-charging mode, then becomes constant at $I_1$ in the constant current mode, and becomes $I_2$ in the constant voltage mode, which gradually decreases with the progress of the electric charging.

Figure 7:
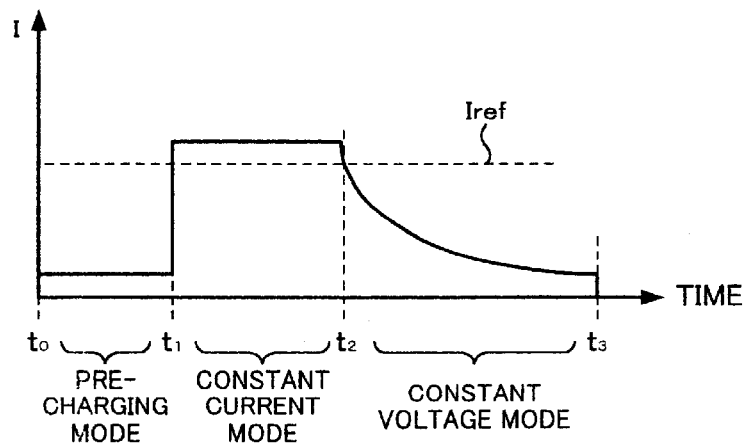
FIG. 7 is a graph showing the property of a current input to the battery cartridge.

Therefore, as shown in FIG. 7, by detecting the charge current $I_{IN}$ and comparing it with a reference current Iref, the mode can be identified as the constant current mode if the charge current $I_{IN}$ is larger than the reference current Iref, or as the constant voltage mode or pre-charging mode if the charge current $I_{IN}$ is smaller than the reference current Iref.

Figure 8:
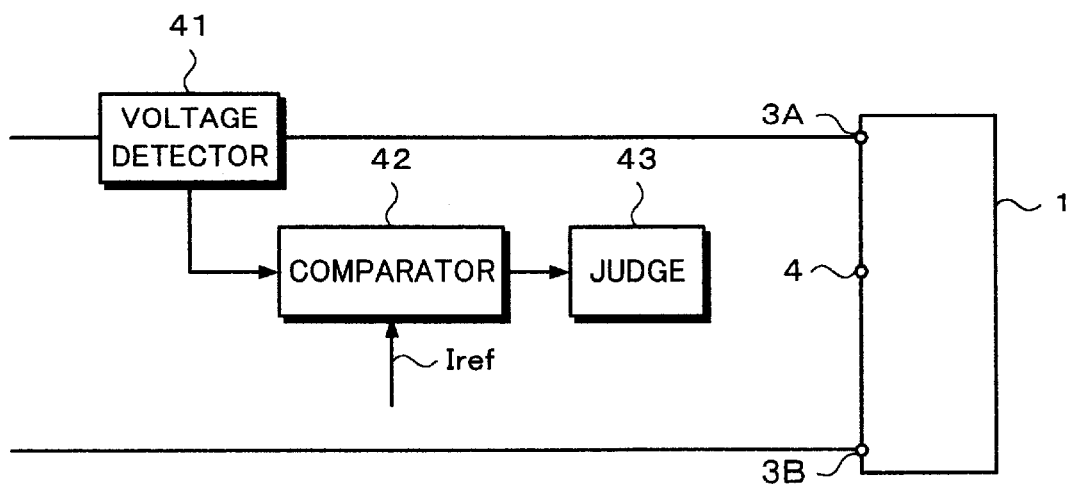
FIG. 8 is a block diagram showing another charging mode judge circuit.

FIG. 8 shows a structure of the judge circuit configured to judge the charging mode by comparing the value of the charge current $I_{IN}$ with the reference current Iref. In FIG. 8, the value of the charge current applied across the positive terminal 3A and the negative terminal 3B of the battery cartridge 1 is detected by a current detector circuit 41. Output of the current detector circuit 41 is supplied to a comparator circuit 42 which is also supplied with a reference current value Iref. The comparator 42 compares the value of the charge current $I_{IN}$ with the value of the reference current Iref, and supplies its output to a judge circuit 43. In response to the output from the comparator circuit 42, the judge circuit 43 identifies the charging mode to be the constant current mode if the value of the charge current $I_{IN}$ is larger than the reference current value Iref or to be the constant voltage mode or pre-charging mode if the value of the charge current $I_{IN}$ is smaller than the reference current value Iref.

Figure 9:
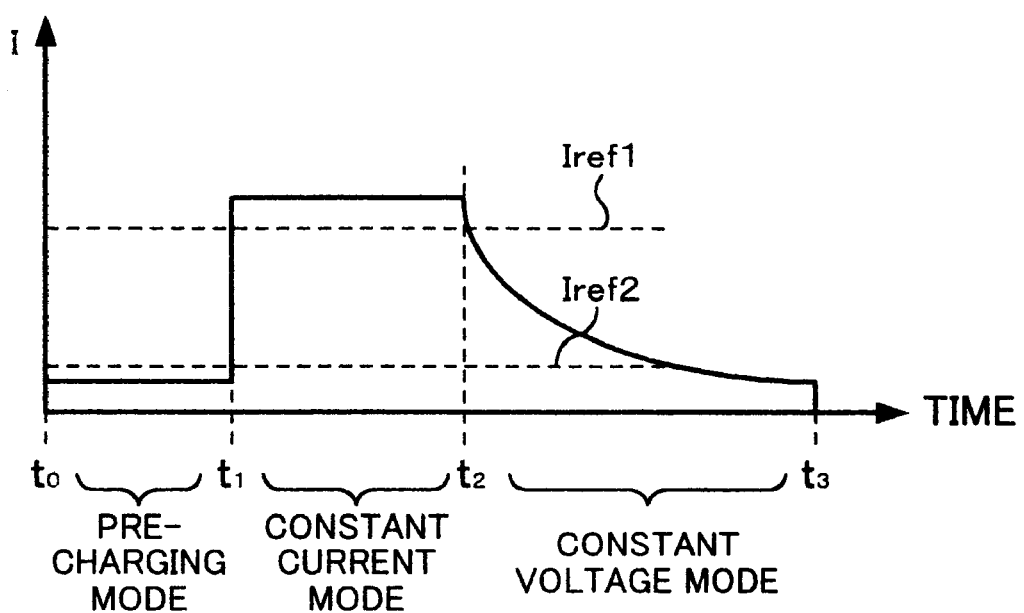
FIG. 9 is a graph showing the property of a current input to the battery cartridge.

In the example shown above, a single reference current value Iref is used. However, as shown in FIG. 9, by using two reference current values Iref1 and Iref2, the pre-charging mode, constant current mode and constant voltage mode can be distinguished from each other.

In addition, the changing ratio of the charge current $I_{IN}$ is substantially constant in the pre-charging mode and the constant current mode, and gradually decreases in the constant voltage mode while the electric charging progresses. Using this nature, it is possible to detect the changing ratio of the charge current $I_{IN}$ and to identify the charging mode as the constant voltage mode if the changing ratio of the charge current $I_{IN}$ is large or as the pre-charging or constant current mode if the changing ratio of the charge current $I_{IN}$ is small.

Figure 10:
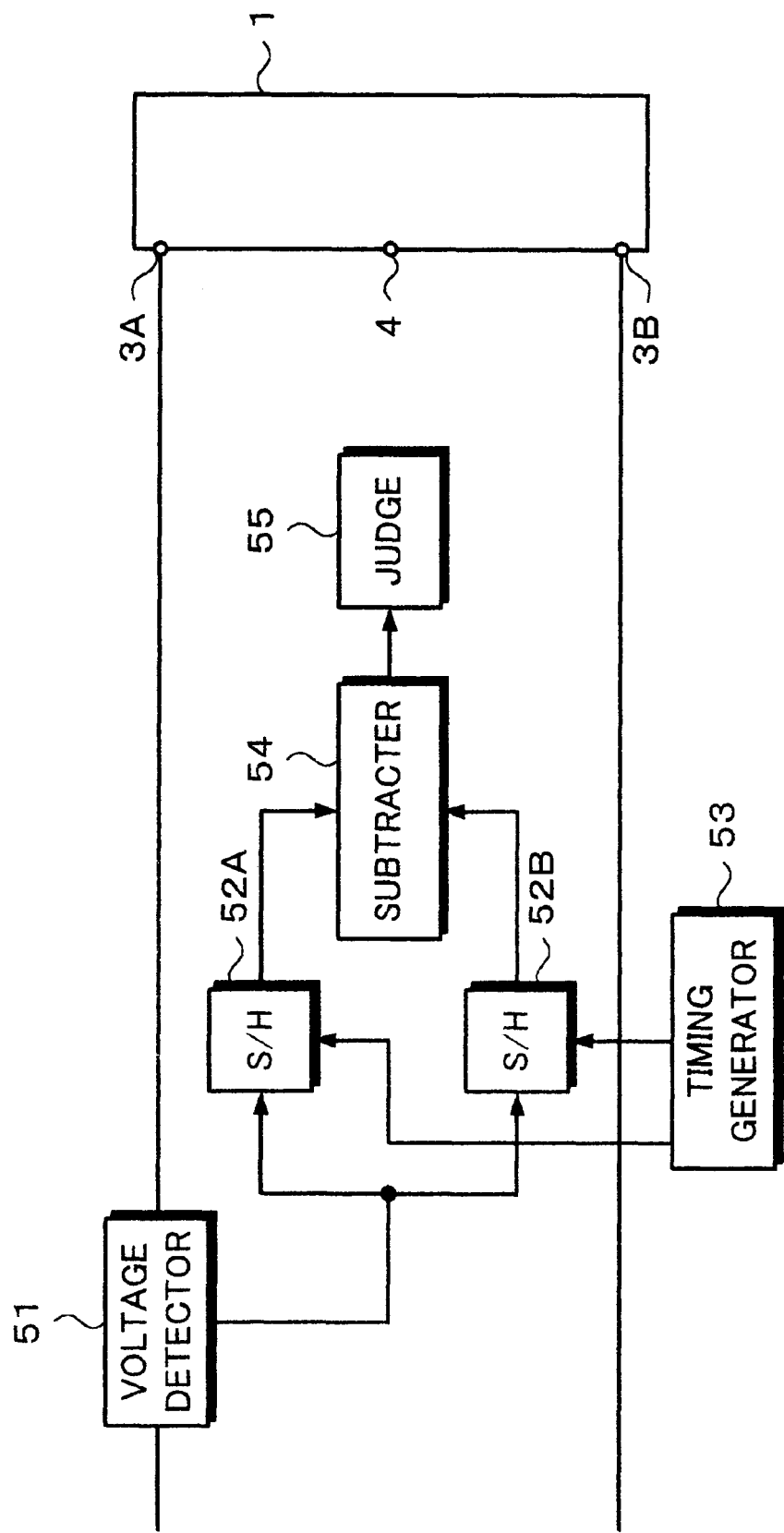
FIG. 10 is a block diagram showing another charging mode judge circuit.

FIG. 10 shows a structure of the judge circuit configured to judge the charging mode by detecting the changing ratio of the charge current $I_{IN}$. In FIG. 10, a current detector circuit 51 detects the level of the charge current $I_{IN}$ applied across the positive terminal 3A and the negative terminal 3B of the battery cartridge 1. Output of the current detector circuit 51 is supplied to sample hold circuits 52A and 52B which are also supplied hold pulses from a timing generating circuit 53 in predetermined time intervals ΔT. These sample hold circuits 52A and 52B hold values of the charge current $I_{IN}$ at different points of time by the predetermined interval ΔT. Outputs of the sample hold circuits 52a and 52B are supplied to a subtracter circuit 54 and undergo subtraction there. As a result, the changing ratio of the charge current $I_{IN}$ in the predetermined interval ΔT is calculated. Output of the subtracter circuit 54 is supplied to a judge circuit 55 which judges the charging mode in response to the output of the subtracter circuit 54. That is, the charging mode is identified as the constant voltage mode if the changing ratio of the charge current $V_{IN}$ is large or as the pre-charging or constant current mode if the changing ratio of the charge current $V_{IN}$ is small.

Figure 11:
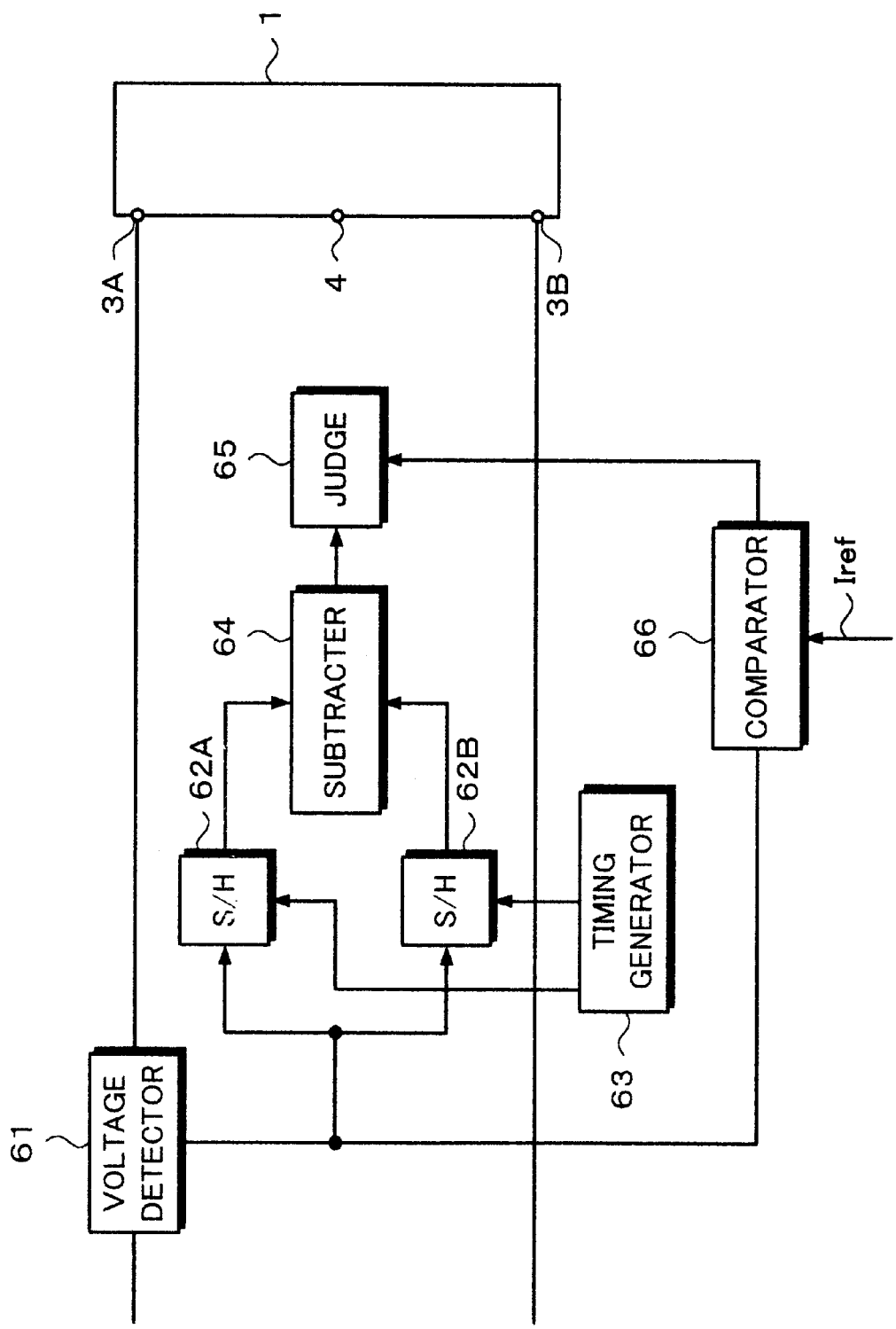
FIG. 11 is a block diagram showing another charging mode judge circuit.

Furthermore, as shown in FIG. 11, the circuit can be so configured that a current detector circuit 61 detects the level of the charge current $V_{IN}$ applied across the positive terminal 3A and the negative terminal 3B of the battery cartridge 1, sample hold circuit 62A, 62B, timing generating circuit 63 and subtracter circuit 54 detect the changing ratio of the charge current $V_{IN}$, a comparator circuit 66 detects whether the value of the charge current $V_{IN}$ is larger than the reference current value Iref or not, and a judge circuit 65 judges the charging mode from the changing ratio of the charge current $V_{IN}$ and from whether the level of the charge current $V_{IN}$ exceeds the reference current value Iref or not.

The charge current takes different values in the pre-charging mode, constant current mode and constant voltage mode. Therefore, by detecting the charge current value, the pre-charging mode, constant current mode and constant voltage mode can be distinguished from each other.

In this manner, when a lithium ion battery is used as the secondary battery, distinction between the pre-charging or constant voltage mode and the constant current mode is possible by detecting the charge voltage value. By detecting the charge current value, distinction among the pre-charging mode, constant current mode and constant voltage mode is possible.

Figure 12:
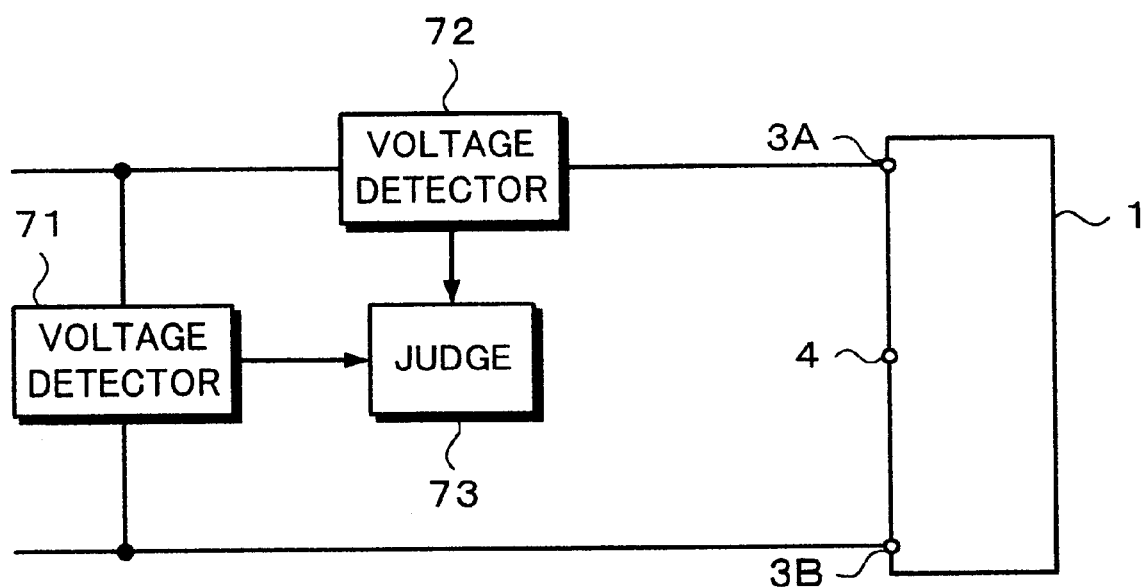
FIG. 12 is a block diagram showing another charging mode judge circuit.

Moreover, as shown in FIG. 12, it is also possible to provide a voltage detector circuit 71 for detecting the charge voltage and a current detector circuit 72 for detecting the charge current, so that a judge circuit 73 judges the charging mode from both the level or changing ratio of the charge voltage, and the value of changing ratio of the charge current. By using both the charge voltage and the charge current for distinction of the charge mode, more reliable distinction of the charging mode is ensured.

Figure 13:
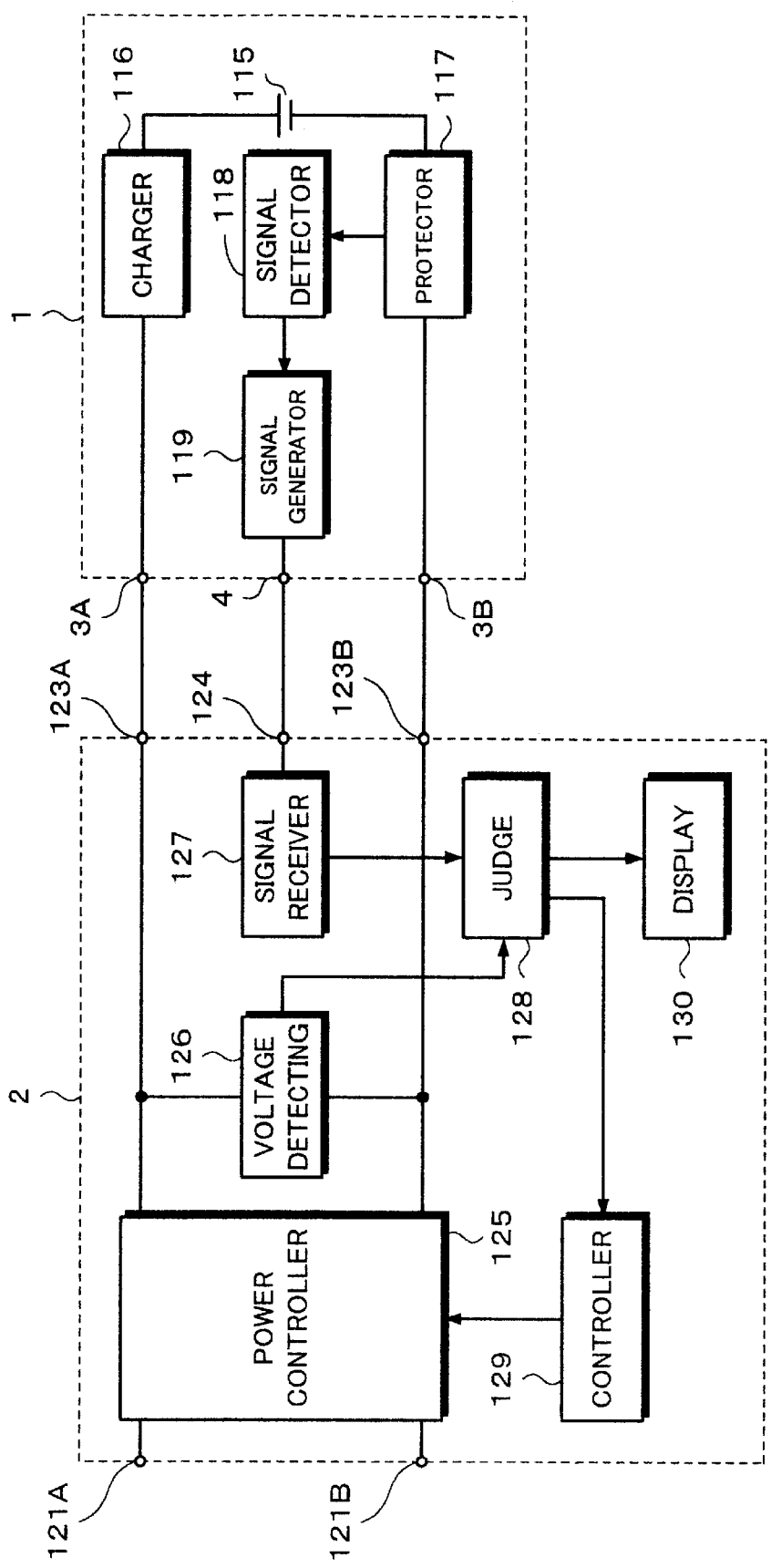
FIG. 13 is a block diagram of a charging circuit of a battery cartridge to which the invention is applied.

Next explained is a specific structure of the charging adapter of the portable telephone terminal to which the invention is applied. FIG. 13 shows an example configured to judge the charging mode by detecting the charge voltage. As explained above, in case of the structure configured to judge the charging mode by detecting the charge voltage, the pre-charging or constant voltage mode and the constant current mode can be discriminated.

In FIG. 12, when the battery cartridge 1 is electrically charged, the battery cartridge 1 is connected to the charging adapter 2. The battery cartridge 1 has the positive and negative terminals 3A, 3B and communication terminal 4. Inside the battery cartridge 1, there are provided a lithium ion battery 115, charging circuit 116 for electrically charging the lithium ion battery 115, and protection circuit 117 activated when the lithium ion battery 115 generates excessive heat. Further provided in the battery cartridge 1 are a detection signal detector circuit 118 supplied with output from the charging circuit 116 and output from the protection circuit 117, and a signal generating circuit 19 responsive to output of the signal detector circuit 118 to generate a control signal.

Output from the charging circuit 116 is battery information about the charged capacity of the lithium ion battery 115 or about short circuit of the battery, if any, for example, and this battery information is supplied to the signal detector circuit 118. If the lithium ion battery 15 generates abnormally high heat, the protection circuit 117 is activated. Information of the protection circuit 117 is detected by the signal detector circuit 118.

Based on the information from the charging circuit 116 or information from the protection circuit 117, the signal detector circuit 118 creates control signals which represent charging stop information STOP_INFO, capacity information CAP_INFO, full charge information FULL_INFO and battery defect information DEF_INFO, respectively. These control signals are output through the communication terminal 4.

As explained before, by detecting the charge voltage input to the battery cartridge 1, the pre-charging or constant current mode and the constant current mode can be distinguished. Therefore, an identical control signal can be used for both information used in the pre-charging or constant voltage mode and information used in the constant current mode.

Figures 14, 15, 16:
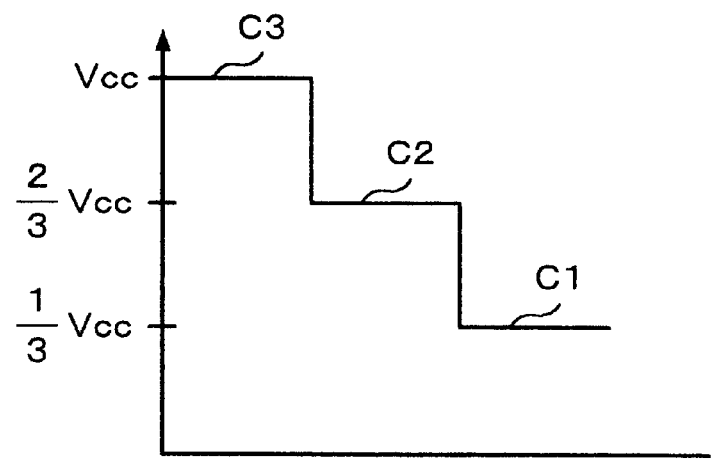
FIG. 14 is a diagram used for explaining a control signal in the charging circuit of the battery cartridge to which the invention is applied.
FIG. 15 is a diagram used for explaining another control signal in the charging circuit of the battery cartridge to which the invention is applied.
FIG. 16 is a diagram used for explaining still another control signal in the charging circuit of the battery cartridge to which the invention is applied.

FIG. 14 shows an example of control signals. Among these control signals, a control signal C3 is assigned to the charging stop information STOP_INFO, a control signal C2 to the capacity information CAP_INFO, a control signal C2 to the full charge information FULL_INFO, and a control signal C1 to the battery defect information DEF_INFO, for example, as shown in FIG. 14.

In the example shown in FIG. 14, an identical control signal C2 is assigned to both the capacity information CAP_INFO and the full charge information FULL_INFO. Although the control signal C2 is used commonly, the capacity information CAP_INFO is used in the constant current mode whereas the full charge information FULL_INFO is used in the constant voltage mode. Moreover, the pre-charging or constant voltage mode and the constant current mode can be distinguished from the charging voltage. Therefore, the common control signal C2 can be assigned to both the capacity information CAP_INFO and the full charge information FULL_INFO.

The control signals C1 through C3 are signals expressed by different numbers of pulses or different widths of pulses. When the control signals C1 through C3 are expressed by different numbers of pulses, numbers of pulses may be determined as "3" for the control signal C3, "2" for the control signal C2 and "1" for the control signal C1, for example, as shown in FIG. 15.

Alternatively, the control signals C1 through C3 may be expressed in different voltage levels, for example. In this case, voltage levels may be determined as Vcc for the control signal C3, (2/3) Vcc for the control signal C2 and (1/3) Vcc for the control signal C1, for example, as shown in FIG. 16.

Further, the control signals C1 to C3 may be expressed in different current values. In this case, the current value may be determined as $I_{f0}$ for the control signal C3, (2/3) $I_{f0}$ for the control signal C2, and (1/3) $I_{f0}$ for the control signal C1.

On the other hand, in FIG. 13, the charging adapter 2 for charging the battery cartridge 1 includes a power control circuit 125 for controlling a constant voltage or a constant current, voltage detector circuit 126 for detecting whether the output voltage of the power control circuit 125 is above a predetermined voltage or not, signal receiving circuit 127 for receiving signals from a communication terminal 124, judge circuit 128 for judging information corresponding to a control signal sent from the battery cartridge 1 in response to an output of the voltage detector circuit 126 and an output of the signal receiving circuit 127, and control circuit 129 for controlling the power source in response to an output of the judge circuit 128.

When the battery cartridge 1 is electrically charged, the positive and negative terminals 3A, 3B and communication terminal 4 of the battery cartridge 1 are connected to positive and negative charge output terminals 123A, 123B and communication terminal 124 of the charging adapter 2, respectively.

Then, a power from a power source adapter is supplied to power input terminals 121A and 121B of the charging adapter 2. This power is supplied to the power control circuit 125, then output through the charge output terminals 123A and 123B, and supplied to the positive and negative terminals 3A and 3B of the battery cartridge 1. Then, under control by the charging adapter 2, the secondary battery 115 inside the battery cartridge 1 is electrically charged.

When a lithium ion battery is used, the charging adapter 2 is first set in the pre-charging mode. In this pre-charging mode, the power control circuit 125 is controlled to supply a constant voltage. Outputs from the charging output terminals 123A and 123B are supplied to the charging circuit 116 via the positive and negative terminals 3A and 3B of the battery cartridge 1, and the lithium ion battery 115 is charged under the constant voltage.

At that time, output of the voltage detector circuit 126 is supplied to the judge circuit 128 which responsively judges whether the charge voltage is above a predetermined value or not. From the charge voltage, the charging mode is identified to be the pre-charging or constant voltage mode, or the constant current mode.

In the pre-charging mode, if the battery is defective, the control signal C1 is sent from the signal generating circuit 119 in the battery cartridge 1. The control signal C1 is sent through the communication terminal 4, received at the signal receiving circuit 127 via the communication terminal 124 of the charging adapter 2, and supplied to the judge circuit 128.

When the judge circuit 128 detects the control signal C1 during the time judged to be the pre-charging mode, it regards the control signal C1 as the battery defect information DEFECT_INFO. Then, in response to a corresponding output of the judge circuit 128, the display circuit 130 displays representation indicating the defect of the battery.

After the pre-charging mode, the circuit is set in the constant current mode. In the constant current mode, the power control circuit 125 is controlled to supply a constant current. Then, outputs from the power output terminal 123A and 123B of the charging adapter 2 are supplied through the positive and negative terminals 3A and 3B of the battery cartridge 1 to the charging circuit 116, and the lithium ion battery 115 is charged under the constant current.

In the constant current mode, when the battery capacity exceeds 70%, for example, the control signal C2 is generated from the signal generating circuit 119 in the battery cartridge 1. The control signal C2 is sent through the communication terminal 4 of the battery cartridge 1, received at the signal receiving circuit 126 via the communication terminal 124 of the charging adapter 2, and supplied to the judge circuit. When the judge circuit detects the control signal C2 in the period judge to be the constant current mode, it regards the control signal C2 to be the capacity information CAP_INFO. Then, in response to the corresponding output of the judge circuit 128, the power source is controlled, and the display circuit 130 displays representation indicating the charge capacity.

After the constant current mode, the circuit is set in the constant voltage mode. In the constant voltage mode, the power control circuit 125 is controlled to supply a constant current. Outputs from the power output terminals 123A and 1239 of the charging adapter 2 are supplied through the positive and negative terminals 3A and 3B of the battery cartridge 1 to the charging circuit 116, and lithium ion battery 115 is charged under the constant voltage.

In the constant voltage mode, when the battery is fully charged, the control signal C2 is generated from the signal generating circuit 119 of the battery cartridge 1. The control signal C2 is sent from the communication terminal 4 of the battery cartridge 1, received at the signal receiving circuit 127 via the communication terminal 124 of the charging adapter 2, and supplied to the judge circuit 128. When the judge circuit 128 detects the control signal C2 in the period judged to be the constant voltage mode, it regards the control signal C2 as full charge information FULL_INFO. Then, in response to the corresponding output of the judge circuit 128, the power source is controlled, and the display circuit displays representation indicating the charged capacity.

In all of the charging modes, if any error occurs during the charging operation, the control signal C3 is generated from the signal generating circuit 119 in the battery cartridge 1. The control signal C3 is sent through the communication terminal 4 of the battery cartridge 1, received at the signal receiving circuit 127 via the communication terminal 124 of the charging adapter 2, and supplied to the judge circuit 128. When the judge circuit 128 detects the control signal C3, it regards the control signal C3 as charging stop information STOP_INFO. Then, in response to the corresponding output of the judge circuit 128, the supply of the power is stopped.

Figure 17:
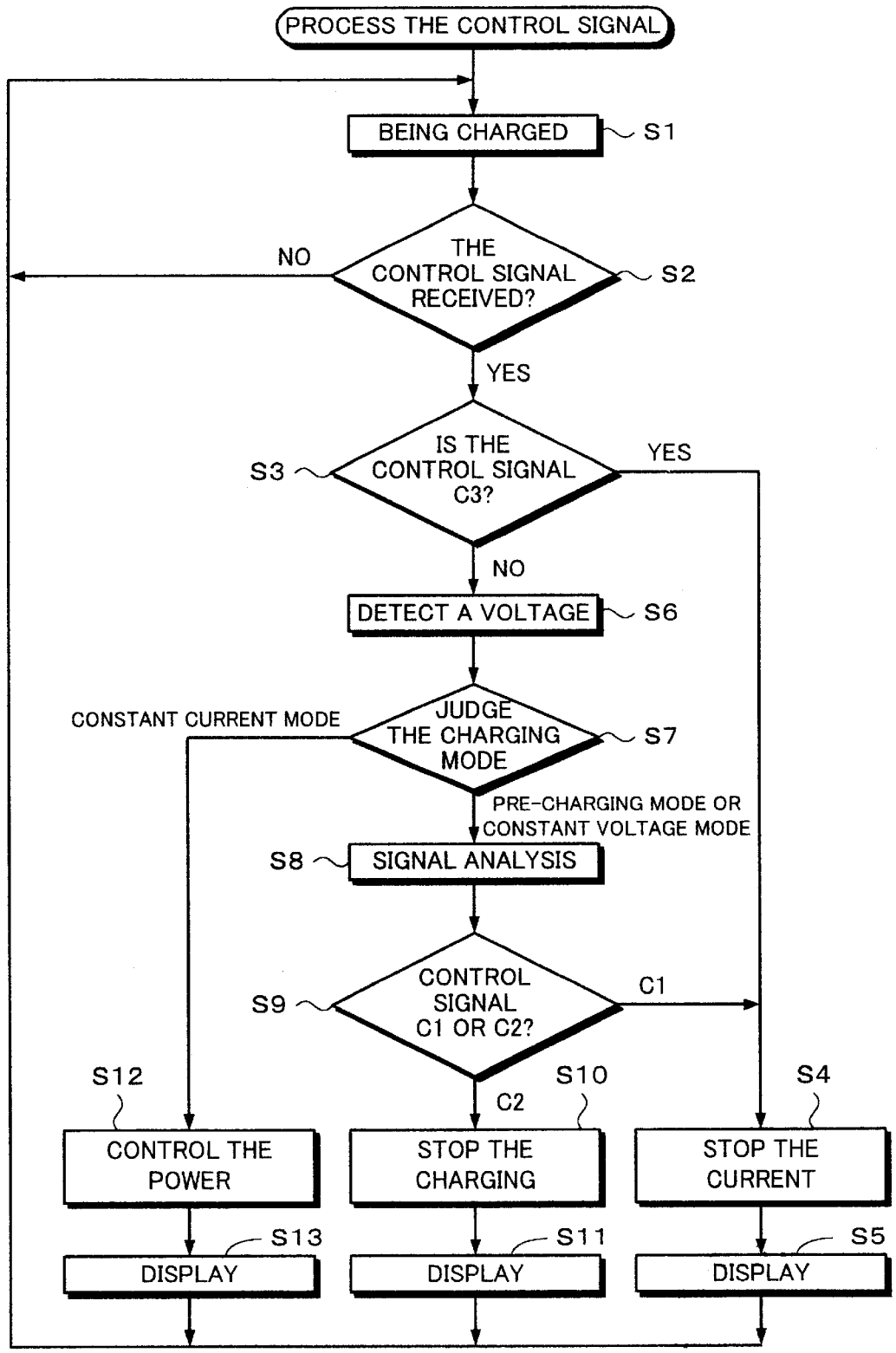
FIG. 17 is a flow chart used for explaining operations of the charging circuit of the battery cartridge to which the invention is applied.

FIG. 17 is a flow chart showing the processing in the judge circuit 128. In FIG. 17, while the battery is charged (step S1), it is judged whether the signal receiving circuit 127 has received a control signal from the communication terminal 4 of the battery cartridge 1 (step S2). If any control signal has been received, it is judged to be the control signal C3 or not (step S3).

As shown in FIG. 14, the control signal C3 is sent as charging stop information STOP_INFO for stopping the electric charging when any error is found. If the currently received signal is the control signal C3, the electric charging is stopped (step S4), and representation indicating occurrence of the error is displayed (step S5).

If the currently received control signal is not the control signal C3, the charge voltage level is detected from an output of the voltage detector circuit 126 (step S6). If the charge voltage level is larger than a predetermined value, the current mode is judged to be the pre-charging mode or the constant voltage mode. If the charge voltage level is smaller than the predetermined value, the current mode is judged to be the constant current mode (step S7).

If the current mode is judged to be the pre-charging or constant voltage mode in step S7, the received control signal is analyzed (step S8). In the pre-charging mode, the control signal C1 may be sent as battery defect information DEFECT_INFO, or the control signal C3 may be sent as ful stop information STOP_INFO, as shown in FIG. 14. If the circuit is currently in the constant voltage mode, the control signal C2 may be sent as full charge information FULL_INFO, or the control signal C3 may be sent as charging stop information STOP_INFO. The control signal C3 has been already detected in step S3. Therefore, the control signal possibly received further is the control signal C1 sent as battery defect information DEFECT_INFO in the pre-charging mode, or the control signal C2 sent as full charge information FULL_INFO in the constant voltage mode.

In review of the result of the analysis in step S8, it is judged whether the currently received signal is the control signal C1 or the control signal C2 (step S9). If it is the control signal C1, under the determination that the battery defect information DEFECT_INFO has been sent in the pre-charging mode, the electric charging is stopped (step S4), and representation indicating occurrence of an error is displayed (step S5).

If it is the control signal C2, under the determination that the full charge information FULL_INFO has been sent in the constant voltage mode, the electric charging is topped (step S10), and representation indicating completion of the electric charging is displayed (step S11).

In step S7, if the charging mode is determined as the constant current mode, although control signals possibly sent in the constant current mode are the control signal C2 as capacity information CAP_INFO and the control signal C3 as charging stop information STOP_INFO, since the control signal has been already detected in step S3, here is determined that the currently received signal is the control signal C2 as capacity information CAP_INFO. Then, the power source is controlled (step S12), and representation indicating it is displayed (step S13).

Although the processing of the judge circuit 128 has been explained above by way of the flow chart, this processing can be realized by using gate circuits. In this case, reduction in size and weight is possible. Needless to say, it is also possible to use a microcomputer.

Figure 18:
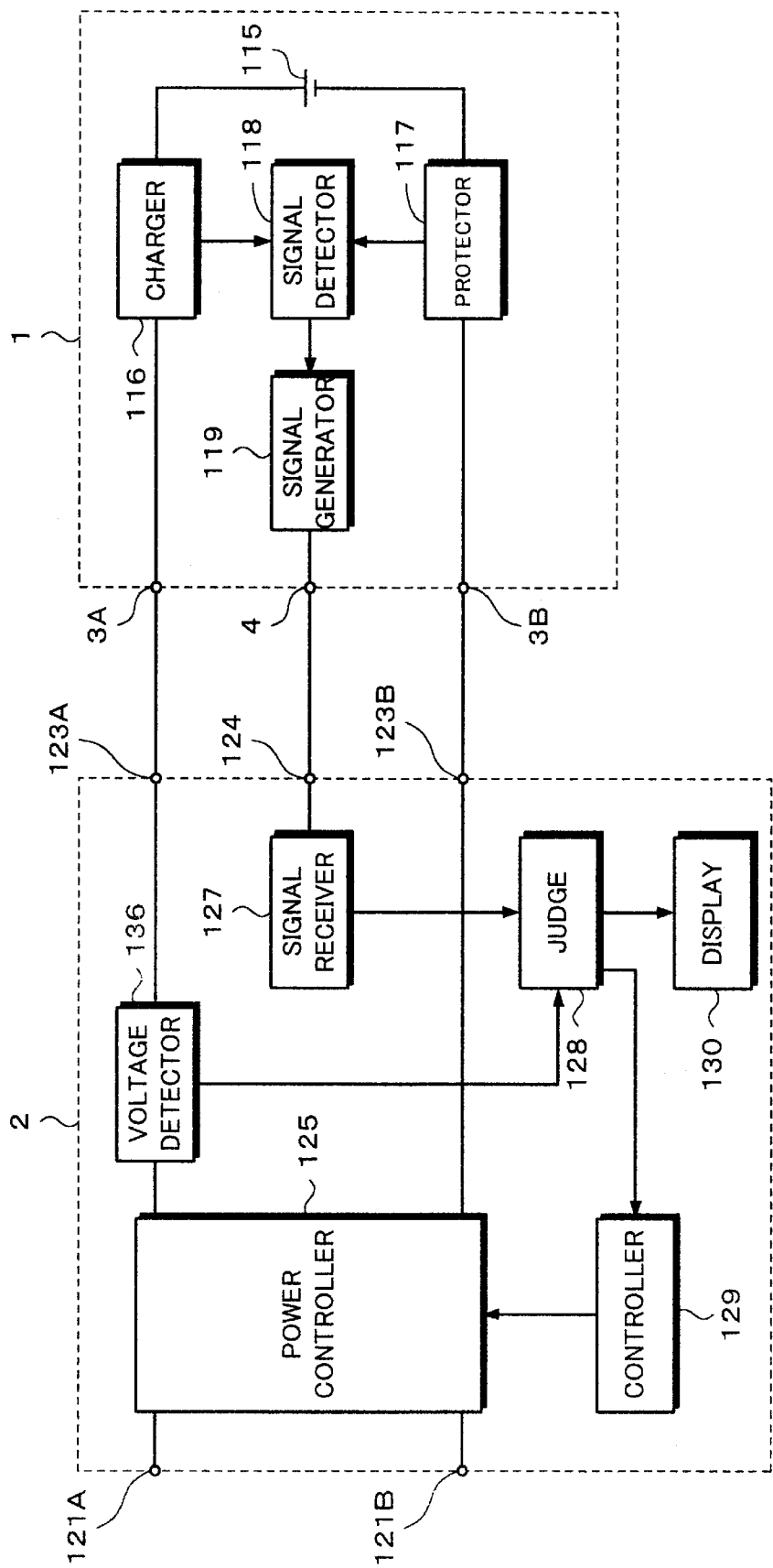
FIG. 18 is a block diagram of a charging circuit of another battery cartridge to which the invention is applied.

FIG. 18 is an example configured to judge the charging mode by detecting the charge current. As explained above, when judgement of the charging mode relies on detection of the charge current, distinction among the pre-charging mode, constant voltage mode and constant current mode is possible.

This structure is essentially the same as the example shown in FIG. 13 in which the charging mode is judged by detecting the value of the charge voltage as explained above. A structural difference between the example of FIG. 18 configured to judge the charging mode by detecting the value of the charge current and the example of FIG. 13 configured to judge the charging mode by detecting the value of the charge voltage lies in that, whereas the voltage detecting circuit 126 feeds the judge circuit 128 in FIG. 13, a current detector circuit 136 feeds the judge circuit 128 in FIG. 18. Then, the judge circuit 128 judges from the current value whether the current mode is the pre-charging mode, constant voltage mode or constant current mode.

In the example of FIG. 13 configured to judge the charging mode by detecting the value of the charge voltage, distinction between the pre-charging mode and the constant voltage mode is not possible. However, in the example of FIG. 18 configured to judge the charging mode by detecting the value of the charge current, all of the pre-charging mode, constant voltage mode and constant current mode can be distinguished. In this example, a control signal can be commonly used for information used n the pre-charging mode, information used in the constant voltage mode, and information used in the constant current mode. This control signal is assigned as shown in FIG. 19, for example.

Figures 19, 20:
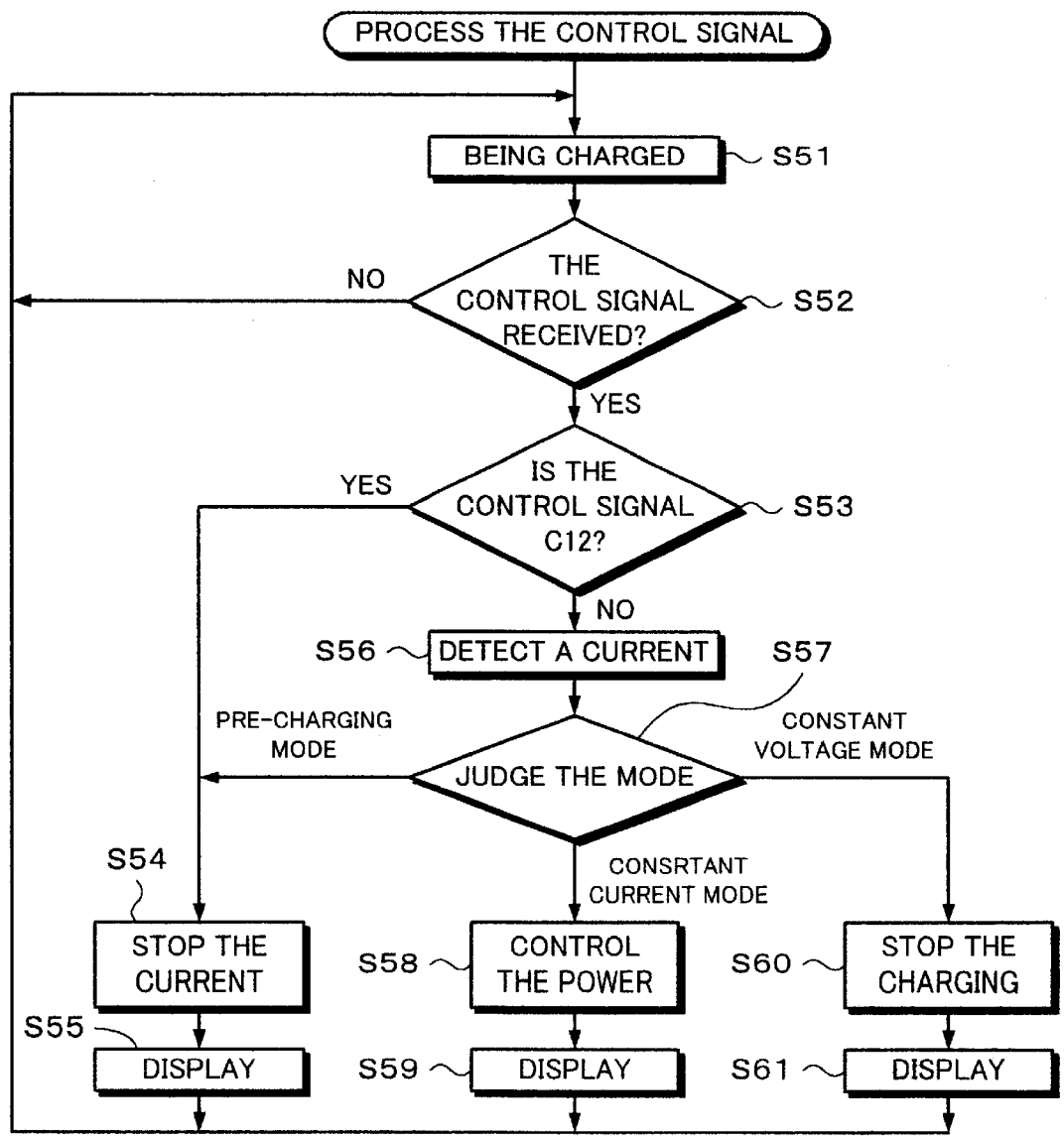
FIG. 19 is a diagram used for explaining another control signal in the charging circuit of the battery cartridge to which the invention is applied.
FIG. 20 is a flow chart used for explaining operations of the charging circuit of the battery cartridge to which the invention is applied.
Figure 22:
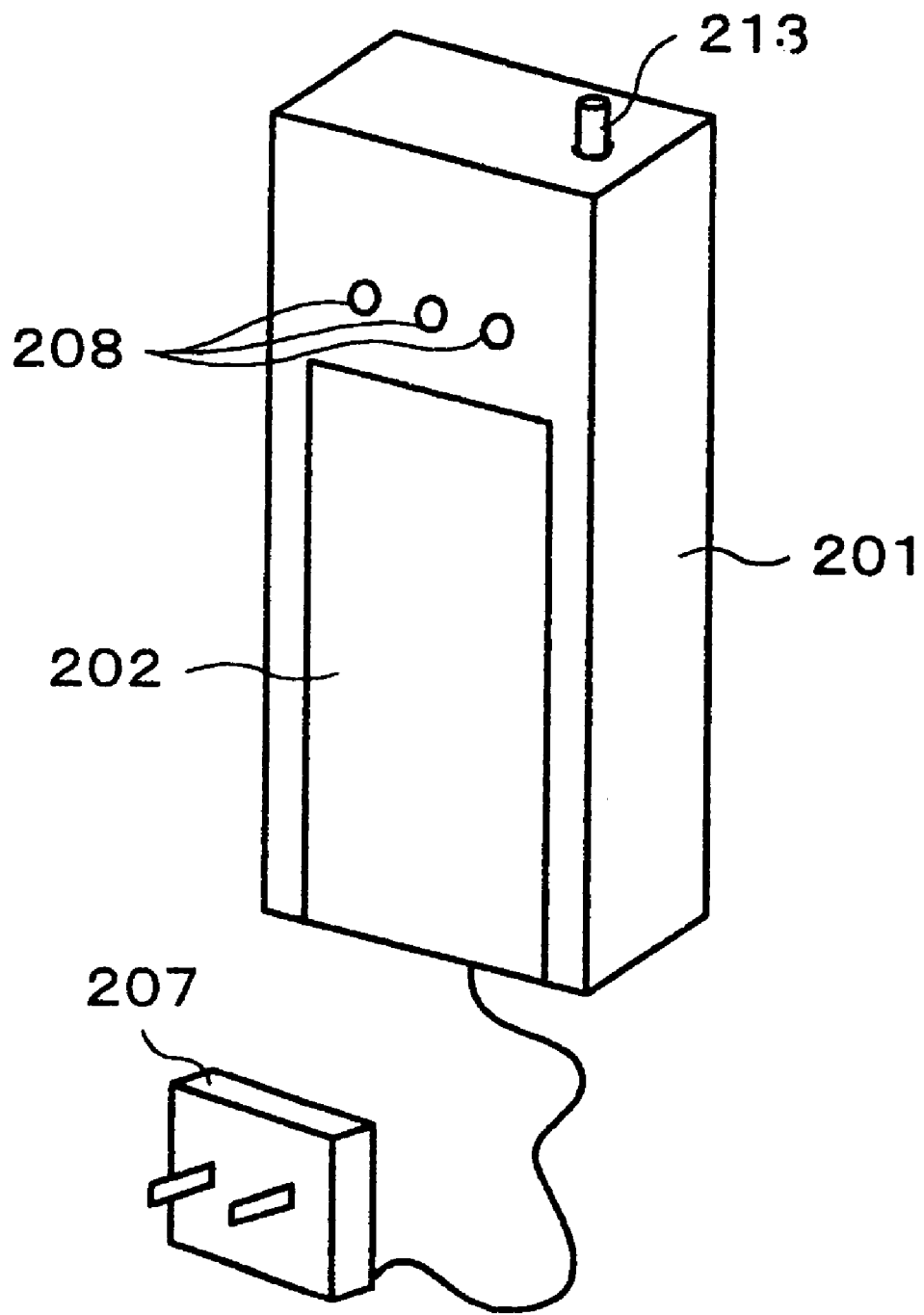
FIG. 22 is a perspective view used for explaining another conventional portable telephone terminal, battery cartridge mounted in the portable telephone terminal and charging adapter for charging the battery cartridge.

As shown in FIG. 19, charging stop information STOP_INFO is expressed by a control signal C12, and all of the capacity information CAP_INFO, full charge information FULL_INFO and battery defect information DEFECT_INFO are expressed by the control signal C12.

Since the pre-charging mode, constant voltage mode and constant current mode can be distinguished from each other by detecting the current value, an identical control signal C11 can be assigned to the charge stop information STOP_INFO, capacity information CAP_INFO, full charge information FULL_INFO and battery defect information DEF_INFO as shown in FIG. 19. Since the pre-charging mode, constant voltage mode and constant current mode can be distinguished by detecting the current value, processing in the judge circuit 128 is simplified as well.

FIG. 20 is a flow chart showing processing in the judge circuit 128. In FIG. 20, while the battery is charged (step S51), it is judged whether the signal receiving circuit 127 has received a control signal from the communication terminal 4 of the battery cartridge 1 (step S52). If any control signal has been received, it is judged whether it is the control signal C12 or not (step S53).

The control signal C12 is sent as charge stop information STOP_INFO for stopping the electric charging when any error occurs. If the currently received control signal is the control signal C12, the electric charging is stopped (step S54), and representation indicating occurrence of an error is displayed (step S55).

If the received signal is not the control signal C12, the charge current is detected from an output of the current detector circuit 136 (step S56). Then, the charging mode is identified from the detected value of the charge current (step S57).

The signal sent in the pre-charging mode can be the control signal as battery defect information DEFECT_INFO or the control signal C12 as charging stop information STOP_INFO as shown in FIG. 19. However, since the control signal C12 has been already detected in step S53, when the charging mode is identified as the pre-charging mode in step S57, the received signal is judged to be the control signal C11 representing battery defect information DEFECT_INFO. then, the electric charging is stopped (step S54), and representation of the error is displayed (step S55).

The signal sent in the constant current mode can be the control signal C11 as capacity information CAP_INFO or the control signal C12 as charging stop information STOP_INFO as shown in FIG. 19. However, the control signal has been already detected in step S53. Therefore, if the charging mode is identified as the constant current mode in step S57, the received signal is judged to be the control signal C11 representing capacity information CAP_INFO. Thus, the charging operation is controlled (step S57), and the charged status is displayed (step S59).

The signal sent in the constant voltage mode can be the control signal C11 as full charge information FULL_INFO or the control signal C!" as charging stop information STOP_INFO as shown in FIG. 19. However, the control signal C12 has been already detected in step S53. Therefore, if the charging mode is identified as the constant voltage mode in step S57, the received signal is judged to be the control signal C11 representing full charge information FULL_INFO. Thus, the charging operation is stopped (step S60), and completion of the electric charging is displayed (step S61).

In the above-explained examples, the charging circuit 116 is provided inside the battery cartridge 1. However, the charging circuit 116 may be placed outside the battery cartridge 1.

In the above-explained examples, the lithium ion battery is used as the battery cartridge. However, the invention is applicable also when using a nickel cadmium battery or a nickel hydrogen battery.

In the above-explained examples, the battery cartridge has been explained as being one of a portable telephone terminal. However, the invention is applicable also to battery cartridges of other electronic devices.

As described above, according to the invention, a control signal is assigned to particular information in each charging mode. By assigning each control signal to each piece of information in each charging mode, an identical control signal can be assigned to different pieces of information in different charging modes. And these charging modes can be distinguished by detecting properties of a charge voltage or charge current input to the battery cartridge. As a result, the number of control signals output from the communication terminal can be reduced without reducing the entire number of pieces of information.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What claimed is:

1. A battery charger for electrically charging a battery cartridge having electrode terminals for charging a secondary battery contained in said battery cartridge and a communication terminal for outputting a plurality of control signals for use in controlling a charging operation of said secondary battery, comprising:

receiver means for receiving the plurality of control signals fed out from said communication terminal and producing therefrom respective output signals;

a voltage detector for detecting a charge voltage being applied to the electrode terminals and producing a charge voltage output signal;

charging mode judge means receiving said charge voltage output signal and said output signals from said receiver means for identifying one of a plurality of different charging modes from a charging curve of said secondary battery and said charge voltage, and for identifying one of a plurality of different pieces of information from said output signals from said receiver means and said one of said plurality of different charging modes and producing an information output signal; and a power controller for controlling the charging operation in accordance with the information output signal.

2. The battery charger according to claim 1 wherein said charging mode judge means distinguishes among said plurality of different charging modes based on a changing ratio of the charge voltage input to said secondary battery.

3. The battery charger according to claim 1 wherein said charging mode judge means distinguishing among said plurality of different charging modes based on a value of the charge current input to said secondary battery.

4. A battery charger for electrically charging a battery cartridge having electrode terminals for charging a secondary battery contained in said battery cartridge and a communication terminal for outputting a plurality of control signals for use in controlling a charging operation of said secondary battery, comprising:

a current detector for detecting a charge current being applied to the electrode terminals and producing a charge current output signal;

receiver means for receiving the plurality of control signals fed out from said communication terminal and producing therefrom respective output signals;

charging mode judge means receiving said charge current output signal and said output signals from said receiver means for identifying one of a plurality of different charging modes using a charging curve of said secondary battery and said charge current signal, and for identifying one of a plurality of different pieces of information using said output signals from said receiver means and said one of said different charging modes and producing an information output signal; and a power controller for controlling the charging operation in accordance with the information output signal.

5. The battery charger according to claim 1 or claim 4 further comprising display means displaying a representation indicating said information output signal.

6. The battery charger according to claim 4 wherein said charging mode judge means distinguishes among said plurality of different charging modes based on a changing ratio of the charging current input to said secondary battery.

7. The battery charger according to claim 1 or claim 14 wherein one of said plurality of control signals is assigned to two different pieces of information in respective charging modes which can be distinguished.

8. The battery charger according to claim 1 or claim 14 wherein said plurality of control signals are expressed by respective different numbers of pulses.

9. The battery charger according to claim 1 or claim 14 wherein said plurality of control signals are expressed by respective different voltage levels.

10. The battery charger according to claim 1 or claim 14 wherein said plurality of control signals are expressed by respective different current levels.

* * * * *